Feb. 19, 1957 L. C. BEARER ET AL 2,782,106
PEBBLE HEAT EXCHANGE CHAMBER
Filed Dec. 26, 1951
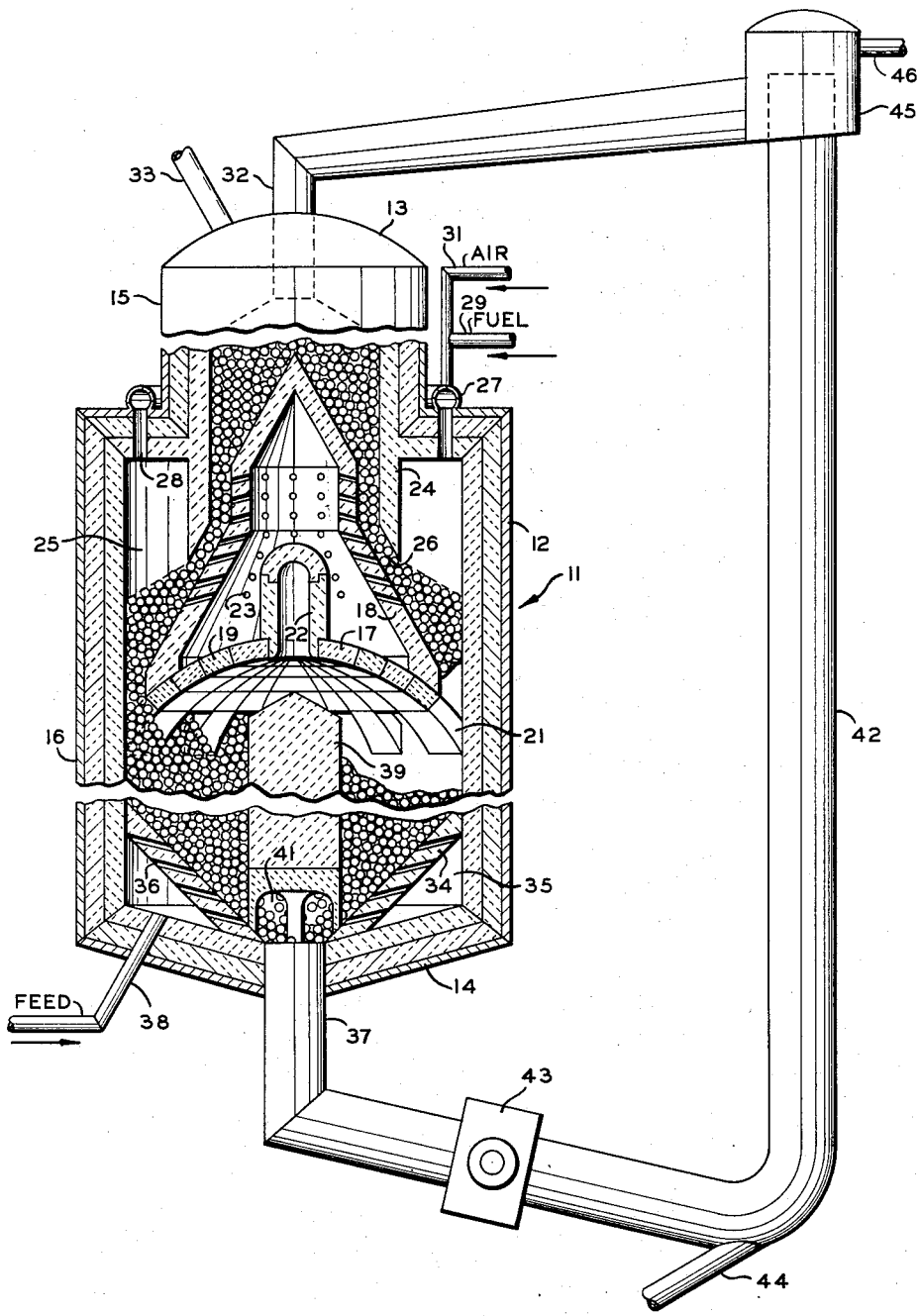
INVENTORS.
L. C. BEARER
R. L. McINTIRE
BY
ATTORNEYS

United States Patent Office 2,782,106
Patented Feb. 19, 1957

2,782,106

PEBBLE HEAT EXCHANGE CHAMBER

Louis C. Bearer and Robert L. McIntire, Bartlesville, Okla., assignors to Phillips Petroleum Company, a corporation of Delaware Application December 26, 1951, Serial No. 263,248

4 Claims. (Cl. 23—284)

This invention relates to pebble heater apparatus. In one of its more specific aspects, it relates to improved single shell pebble heater apparatus. In another of its more specific aspects, it relates to pebble heater structure providing improved gas-pebble contact. In another of its more specific aspects, it relates to a method for operating pebble heater apparatus.

Apparatus of the so-called "pebble heater" type has been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form having strength, which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛" to about 1" in diameter. In a high temperature process, pebbles having a diameter of between ¼" to ⅜" are preferred. The pebbles must be formed of refractory material which will withstand the temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000 F. Pebbles which are used may be either inert or catalytic as used in any selected process.

The pebbles are heated in one of the chambers (preferably the upper one) by direct contact therein with hot gases, usually combustion products, to temperatures generally in the range of 1400 F. to 3200 F. The hot pebbles are thereafter contacted with the fluid to be superheated or reacted, as the case may be, in the other chamber. Generally, pebble inlet temperatures in the second chamber are about 100 F. to 200 F. below the highest temperature of the pebbles within the first chamber. In processes for the production of ethylene from light hydrocarbons, such as ethane or propane, the pebble temperature in the reaction chamber is usually in the range of 1200 F. to 1800 F. For the production of acetylene by pyrolysis of hydrocarbons, temperatures in the range of 1600 F. to 3000 F. are desirable.

One disadvantage of conventional pebble heater apparatus is that pebbles in reaction chambers thereof are not of sufficiently uniform temperature to obtain uniform heating of gaseous materials. Another disadvantage of conventional pebble heater apparatus is that when hydrocarbons are utilized as the material to be contacted with the hot pebbles gravitating through the reaction chamber, reaction products, such as resulting tar and the like, tend to deposit upon the roof of the reactor chamber. Radiant heat from the pebbles and effluent gases cause the tar to decompose to carbon, with the result that a considerable amount of carbon lay-down on the roof of the chamber is encountered. The carbon lay-down has on occasion become so great as to cause a considerable deformation of the normal pattern of the pebble bed and has also resulted in a material alteration of gas flow patterns within the reactor chamber.

By at least one aspect of this invention, at least one of the following objects of the invention is attained. An object of this invention is to provide improved means for thermally treating or reacting gaseous materials. Another object of the invention is to provide improved means for heating pebbles to a more uniform temperature in pebble heater apparatus. Another object of the invention is to provide improved means for preventing carbon lay-down in the upper portion of a reactor chamber. Another object of the invention is to provide an improved method for obtaining more uniform cracking of hydrocarbon materials in a pebble reactor chamber. Other and further objects of the invention will be apparent upon study of the accompanying disclosure.

Broadly speaking, this invention resides in an improvement in the structure of pebble heat exchange apparatus intermediate the ends of a single shell. The improvement comprises the provision of a dome intermediate the ends of the single shell which dome is imperforate except for pebble conduits at its extreme periphery and a gaseous material takeoff conduit extending from the central portion thereof through the side of said shell. A second arch or dome, which is so constructed as to have a much steeper contour with respect to the horizontal than the first dome, extends from the wall of the shell and from the first dome upwardly into the portion of the chamber formed above the first dome. The second dome is perforate through a considerable portion of its length so as to permit the flow of gaseous heating material from a peripheral gas distribution chamber into the interior of the second dome and out of the confines of the second dome at a higher point within the pebble heating portion of the chamber.

Better understanding of the invention will be apparent upon study of the diagrammatic drawing which is a vertical section of the pebble heater apparatus of this invention.

Referring particularly to the device shown in the drawing, pebble heater apparatus 11 comprises a single shell 12 closed at its upper and lower ends by closure members 13 and 14, respectively. The chamber formed within shell 12 is divided into a pebble heating section 15 and a reaction chamber 16 by a combination of domes 17 and 18. Domes 17 and 18 are transversely positioned within shell 12 intermediate the ends of the chamber formed therein. Dome 17 is a load supporting dome. This dome may either be cast in place or may comprise a plurality of refractory shaped blocks 19, as shown in the drawing. It is preferred to form this dome of refractory shaped blocks so as to permit the necessary expansion thereof without encountering large cracks therein due to thermal expansion. Dome 17 is so constructed as to provide pebble outlet conduits 21 at the periphery thereof. An opening is provided in the central portion of dome 17, in which opening conduit 22 is provided, conduit 22 extending from a point in dome 17 to a point outside shell 12.

As pointed out above, dome 18 is so constructed as to provide a considerably steeper slope with respect to the horizontal than does dome 17. Dome 18 extends upwardly and inwardly from shell 12 and from dome 17 and encompasses the upper surface of dome 17 and conduit 22. Dome 18, like dome 17, may be cast in place or may be formed of a plurality of shaped refractory blocks. It is preferred to form dome 18 of refractory blocks because of the considerable amount of expansion and contraction to which that dome is subjected during operation of the pebble heater apparatus. Dome 18 is provided with a plurality of gaseous material conduits 23 uniformly disposed over a major portion of its length. A section of the upper portion of dome 18 conforms in at least a portion of its length generally as a cylinder to the shape of the pebble heating section so as to form an annular pebble passage between dome 18 and the wall of the pebble heating section. The upper end of dome 18 is formed as a cone.

The inner diameter of pebble heating section 15 is considerably smaller than the inner diameter of reaction section 16. The refractory wall of pebble heating section 15 extends downwardly and is supported at the lower end upon dome 18. A portion of that refractory wall, i. e. section 24, is spaced from shell 12 so as to form an annular combustion or gas distribution chamber 25 therebetween. In this manner of construction, the combustion or gas distribution chamber is formed above the outer edges of the two domes 17 and 18 and above the pebble outlet conduits 21. Pebble conduits 26 are provided within refractory wall portion 24 so as to permit the flow of pebbles from the pebble heating section to pebble conduits 21. Header member 27 is connected to combustion or gas distribution chamber 25 by means of conduits 28 and is also connected to inlet conduits 29 and 31, which inlet conduits may be utilized for the introduction of air and fuel to chamber 25. Pebble inlet conduit means 32 is provided in the upper end of shell 12. The pebble inlet conduit means 32 may be in the preferred form of a single centrally positioned conduit, as shown, or may be a plurality of conduits uniformly distributed intermediate the axis and periphery of the upper end of shell 12. Gaseous effluent conduit 33 is provided in the upper end portion of shell 12, preferably in closure member 13.

Perforate floor 34 is provided in the lower portion of reaction section 16 and is spaced above closure member 14 so as to form a gas distribution chamber 35 therebetween. Floor 34 is provided with gaseous material conduits 36 uniformly distributed therethrough so as to permit the flow of gaseous material from chamber 35 into the lower portion of the chamber formed within reaction section 16. Perforate floor 34 is preferably formed as a funnel which extends downwardly from the wall of shell 12 to closure 14. Pebble outlet conduit 37 extends downwardly and centrally through closure member 14 and floor 34. Gaseous material inlet conduit 38 extends through shell 12 into chamber 35. Core 39 is centrally provided within reaction section 16 and extends upwardly from floor 34 to a point above the normal level of pebbles within reaction section 16 but spaced downwardly from dome 17 so as to provide a gas passageway into effluent outlet conduit 22. Core 39 is provided in its lower end with pebble passageways 41 which communicate between the chamber formed within reaction section 16 and pebble outlet conduit 37. Core 39 is preferably larger in diameter than is pebble outlet conduit 37.

Pebble outlet conduit 37 is connected at its lower end to elevator 42 and pebble feeder 43 is provided intermediate the ends of conduit 37 and the bottom of elevator 42. Elevator 42 may be a gas lift type, such as is shown in the drawing, or may be a mechanical type such as a screw conveyor or a bucket type elevator. Lift gas inlet conduit 44 is provided in the lower end of elevator 42 and the upper end of elevator 42 extends into separator chamber 45. Separator chamber 45 is provided with a gaseous material outlet conduit 46 in its upper end portion and the lower end portion of that chamber is connected to the upper end of pebble inlet conduit means 32.

In the operation of the device shown in the drawing, pebbles are introduced into shell 12 through inlet conduit means 32 and gravitate downwardly through pebble heating section 15, conduits 26 and 21 and reaction section 16 as a contiguous gas-pervious mass. Gaseous heating material is introduced into chamber 25 through inlet conduits 29, 31, header 27, and conduits 28. The heating material may be a gaseous fuel and air or may be hot combustion products produced prior to introduction into chamber 25. It is preferred to introduce fuel and air into chamber 25 and to burn that material within chamber 25.

It should be noted that a portion of the pebble mass gravitating from pebble heating section 15 into reaction section 16 is constantly exposed to the radiant heat from the flame and walls within chamber 25. The annular stream of pebbles flowing downwardly through the space between wall portion 24 and the upper end portion of dome 18 is relatively narrow in respect to the cross section of the pebble mass above dome 18. Hot gaseous materials formed within chamber 25 pass downwardly and inwardly in a direction transverse to the flow of pebbles through the lower conduits 23 in dome 18. The size and number of conduits 23 is such that the pressure drop across the thin mass of pebbles at that point is less than the pressure drop upwardly thorugh the annular passage formed between wall portion 24 and the upper portion of dome 18.

This transverse flow of gaseous heating material through the stream of pebbles provides for contact between the gaseous heating material at its highest temperature and the gravitating pebbles immediately before those pebbles gravitate into the reaction section. When the gaseous heating materials flow into the chamber formed within dome 18, a portion of the heat therefrom passes through dome 17 into the upper end portion of heating section 15. In this manner, dome 17 is constantly maintained at a temperature above that of the products resulting from the reaction within section 16. Gaseous effluent conduit 22 is also heated by the heating gases from chamber 25. The deposit of tar upon the surface of dome 17 or within conduit 22 is effectively minimized and carbon lay-down normally encountered in those areas is materially reduced inasmuch as cool areas upon which tar normally deposits are obviated.

The gaseous heating material flows upwardly in dome 18 and outwardly through the upper conduits 23 into the pebble mass gravitating through the annular passage between wall section 24 and the upper end portion of dome 18. The gaseous heating material flowing from conduits 23 into the gravitating mass contacts the inner portion of the pebble annulus at a relatively high temperature. Thus, while the outer portion of the pebble annulus is subjected to radiant heat during combustion of fuel within chamber 25 the inner portion of the annulus is subjected to a longer pebble-gas contact time thus providing a more uniform temperature for the pebbles. The gaseous material passes upwardly through the gravitating mass of pebbles within pebble heating zone 15 giving up additional amounts of heat to those pebbles. The cooled gaseous effluent is removed from the upper portion of section 15 through gaseous effluent conduit 33.

The pebbles which have been heated in the manner described above gravitate through pebble conduits 21 and form an annular pebble mass between shell 12 and core 39. Core 39 reduces the ratio of the conical top of the bed to the overall reactor diameter. Gaseous reactant materials are introduced through inlet conduit 38 into gas distribution chamber 35 and pass into the lower portion of reaction section 16 through inlet conduits 36. The reaction materials pass upwardly through the gravitating pebble mass and are raised to reaction temperature by direct heat exchange with the hot pebbles. Resulting reaction products pass upwardly through the streamlined collector formed by dome 17 and core 39 into the heated, gaseous effluent conduit 22.

The gaseous effluent material is immediately removed from shell 12 through conduit 22 and is passed to a quench, not shown, where the reaction products are lowered in temperature to such an extent that further reaction thereof is stopped. The pebbles gravitate through conduits 41 into pebble outlet conduit 37 and flow through pebble feeder 43 to the lower end of elevator 42. A lift gas is introduced into the lower end of elevator 42 through inlet conduit 44, whereby the pebbles are entrained in the stream of gas and are elevated to separator chamber 45. The pebbles settle out of the gas stream within chamber 45 and gravitate through conduit 32 into the upper portion of pebble heating section 15. The lift gas is removed from the upper portion of separator 45 through outlet conduit 46.

The device of this invention has the advantage that the combustion chamber is provided over the pebble throat in such a manner as to materially reduce the height of the overall pebble heater apparatus. The use of both transverse and vertical flow of gaseous heat exchange material through the pebble mass within the pebble heating section aids in obtaining a more uniform pebble temperature for the reaction section. By utilizing the transverse flow of gaseous heat exchange material through the pebble mass we also accomplish the heating of the dome forming the upper end of the reaction section and of the gaseous effluent conduit from that section.

Other and further advantages and modifications will be apparent upon study of this disclosure. Such modifications are believed to be within the spirit and the scope of this invention.

We claim:

1. An improved pebble heat exchanger comprising in combination a single closed, upright, elongated shell; pebble inlet means in the upper end of said shell; gaseous effluent outlet means in the upper end of said shell; gaseous material inlet means in the lower end portion of said shell; pebble outlet means in the lower end of said shell; a pebble elevator connected at its lower end to said pebble outlet means and at its upper end to said pebble inlet means; a refractory generally annular wall extending downwardly from a restricted central portion of said shell so as to form a combustion chamber between said wall and said shell, said combustion chamber being closed in its upper portion and open in its lower portion; an imperforate load supporting dome transversely disposed within said shell intermediate said combustion chamber and the lower end of said shell, supported at its periphery by said shell and forming a reaction chamber between said dome and the lower end of said shell; a perforate dome, perforate in a section opposite the lower end of said refractory wall and also in a section substantially above the lower end of said refractory wall, extending upwardly and inwardly from said shell and said imperforate dome at a steeper slope than said imperforate dome to a level above the level of said combustion chamber so as to form an annulus between said perforate dome and said refractory wall, said perforate dome being spaced from the lower end of said refractory wall so as to form pebble conduit means therebetween; pebble conduit means disposed at the periphery of said domes leading from the bottom of said combustion chamber into said reaction chamber; and a gaseous effluent conduit extending upwardly through said imperforate dome into the chamber formed between said domes and through said perforate dome and said shell to the exterior of said shell.

2. The pebble heat exchanger of claim 1 wherein said refractory wall is supported at its lower end upon said perforate dome and openings are provided in the lower end of said wall to permit pebble flow therethrough over the surface of said perforate dome.

3. The improved pebble heat exchanger of claim 2 wherein said pebble outlet means is a central outlet; a perforate floor extends downwardly and inwardly from the lower end portion of said shell to said pebble outlet conduit, said perforate floor being spaced from said bottom closure so as to provide a gas distribution chamber therebetween; gas inlet means extending through said shell into said gas distribution chamber; and a central core, spaced above said pebble outlet conduit and said perforate floor, extends upwardly into the upper portion of the chamber formed within said shell and below said imperforate dome.

4. An improved pebble heat exchanger comprising, in combination, a closed upright cylindrical shell having an upper section of restricted diameter; pebble inlet means in the upper end of said shell; gaseous effluent outlet means in the upper end of said shell; gaseous material inlet means in the lower end portion of said shell; pebble outlet means in the lower end of said shell; a generally annular refractory wall extending downwardly from said restricted upper section so as to form a combustion chamber between said wall and said shell, said combustion chamber being closed in its upper portion and open in its lower portion; means for introducing heating gas into the upper section of said combustion chamber; an imperforate load supporting dome transversely disposed within said shell intermediate said combustion chamber and the lower end of said shell forming a reaction chamber between said dome and the lower end of said shell; a second dome extending upwardly and inwardly from said shell and said imperforate dome at a steeper slope than said imperforate dome to a level substantially above the lower end of said annular wall so as to form an annulus for pebble flow between said second dome and said annular wall, said second dome forming an enclosed chamber with said imperforate dome; pebble conduit means leading from the bottom of said combustion chamber into said reaction chamber to provide for flow of pebbles from said annulus into said reaction chamber; conduits for combustion gas leading through an annular section of said second dome opposite the lower end of said annular wall; conduits for combustion gas leading through an annular section of said second dome at a level substantially above the lower end of said annular wall; and gaseous effluent conduit means extending upwardly through said imperforate dome into the chamber within said second dome and through said second dome and said shell to the exterior of said shell.

References Cited in the file of this patent

UNITED STATES PATENTS

| | | |
|---|---|---|
| 2,493,970 | Johnson et al. | Jan. 10, 1950 |
| 2,514,497 | Jones | July 11, 1950 |
| 2,531,725 | Church | Nov. 28, 1950 |
| 2,554,435 | Weber | May 22, 1951 |
| 2,559,876 | Hoekstra | July 10, 1951 |
| 2,565,809 | Goins | Aug. 28, 1951 |
| 2,673,791 | McIntire | Mar. 20, 1954 |